United States Patent [19]

Wiscombe

[11] Patent Number: 5,037,519
[45] Date of Patent: Aug. 6, 1991

[54] ELECTROLYTIC CHLORINE GENERATOR

[75] Inventor: Brent Wiscombe, Mesa, Ariz.

[73] Assignee: Jay W. Hathcock, Tempe, Ariz. ; 'a part interest'

[21] Appl. No.: 591,250

[22] Filed: Oct. 1, 1990

[51] Int. Cl.$^5$ .................. C25B 9/00; C25B 13/02; C25B 15/08

[52] U.S. Cl. .................. 204/237; 204/263; 204/266

[58] Field of Search .............. 204/252–258, 204/263–266, 237

[56] References Cited

U.S. PATENT DOCUMENTS

| | | | |
|---|---|---|---|
| 3,223,242 | 12/1965 | Murray | 210/139 |
| 3,361,663 | 4/1964 | Murray et al. | 204/278 |
| 3,669,857 | 6/1972 | Kirkham et al. | 204/151 |
| 4,097,356 | 6/1978 | Yates | 204/237 |
| 4,136,005 | 1/1979 | Persson et al. | 204/266 |
| 4,248,715 | 2/1981 | Olivier | 204/260 |
| 4,250,126 | 2/1981 | Yates | 204/237 X |
| 4,308,123 | 12/1981 | Lynn | 204/266 |
| 4,324,635 | 4/1982 | Sweeney | 204/266 |
| 4,334,968 | 6/1982 | Sweeney | 204/96 |
| 4,381,240 | 4/1983 | Russell | 210/746 |
| 4,439,295 | 3/1984 | Richards | 204/229 |
| 4,472,256 | 9/1984 | Hilbig | 204/266 |
| 4,496,452 | 1/1985 | Bianchi | 204/266 |
| 4,500,404 | 2/1985 | Tucker | 204/266 |
| 4,599,159 | 7/1986 | Hilbig | 204/266 |
| 4,613,415 | 9/1986 | Wreath et al. | 204/98 |
| 4,693,806 | 9/1987 | Tucker | 204/266 X |
| 4,767,511 | 8/1988 | Aragon | 204/237 X |
| 4,808,290 | 2/1989 | Hilbig | 204/266 X |

*Primary Examiner*—Donald R. Valentine
*Attorney, Agent, or Firm*—Warren F. B. Lindsley

[57] ABSTRACT

An electrolytic chlorine generator for chlorinating a body of water employing a container for housing salt brine and having an anode chamber, an open ended cathode chamber mounted to the anode chamber, and a membrane material which divides the anode chamber from the cathode chamber and means for conducting a part of the flowing water from the main body of water to the cell for chlorination purposes.

28 Claims, 5 Drawing Sheets

ELECTROLYTIC CHLORINE GENERATOR

BACKGROUND OF THE INVENTION

This invention relates to improvements in chlorine generating apparatus for swimming pools, fountains, cooling towers and the like, and more particularly to a unique porous configuration for separating the sodium hydroxide solution from the acidic brine solution formed during the generation of chlorine gas as well as the geometrical configuration of the anode, separator, and cathode.

For many years the most common method of chlorinating a body of water, such as a swimming pool, has been by the use of dry hypochlorites or hypochlorite solutions. Another widespread method of chlorinating swimming pools involves the introduction of gaseous chlorine which is stored as liquid chlorine in containers under high pressure. Both of these chlorinating methods have certain disadvantages in that the owner or operator of the pool facility must check the condition of the water substantially daily and treatment of the water is accomplished manually.

In order to overcome these disadvantages, an electrolytic chlorine generator was developed wherein the electrolysis of a solution of metallic chloride salt builds up its own internal pressure and discharges chlorine into a flowing stream.

DESCRIPTION OF THE PRIOR ART

Chlorine generating systems suitable for use in treating swimming pools and the like are known but none have been able to maintain residual chlorine and pH levels at all times which overcomes the shortcomings, serviceability, and maintenance requirements of the prior art devices.

U.S. Pat. No. 3,223,242 discloses a water treatment device employing a timer controlled water recirculating system that operates at maximum efficiency when a portion thereof is maintained below the pressure of the ambient atmosphere which reduced pressure is effected by the cooperative action of the water circulating portion of the swimming pool system.

U.S. Pat. No. 3,361,663 discloses an automatic sanitation system for swimming pools wherein water is pumped from the outlet of the pool to its inlet past a source of halogen gas, which gas is injected into the water. The halogen bearing water then passes to a bed of material that is substantially insoluble in water and is reactant with halogen water solutions.

U.S. Pat. No. 3,669,857 discloses an electrolytic chlorination device providing pH control of water and a two electrode compartment electrolytic cell with the compartments being separated by a cation selective membrane. The effluents resulting from both compartments are fed into the recirculating pool water for sterilization.

U.S. Pat. No. 4,136,005 discloses an electrolytic chlorinator employing an electrolytic cell with means for intermittently transferring small amounts of the anolyte from the anode compartment of the chlorinator to the cathode compartment and for preventing the catholyte from coming into the anode compartment.

U.S. Pat. No. 4,248,715 discloses an electrolytic chlorine generator employing a porous ceramic diaphragm for separating strong caustic solutions existing on one side of a cylindrical diaphragm from weak acidic solutions on the other side thereof without deterioration and wherein the anode and cathodes are rings placed concentrically with the diaphragm and in close proximity to it.

U.S. Pat. No. 4,324,635 discloses an electrolytic generator having two sealed compartments, separated by a cation exchange membrane and having a cathode in one compartment and an anode in the other compartment. The anode containing compartment is provided with a bottom inlet for introducing extra chlorine.

U.S. Pat. No. 4,381,240 discloses a swimming pool water conditioning system which incorporates a pump fed, pool water filtration system, a hydrochloric acid consuming electrolytic chlorine gas generator and a manifold system to draw the chlorine gas into the flow through filtration system.

U.S. Pat. No. 4,334,968 discloses an electrolyte generator employing two seated compartments separated by an ion permeable membrane having a cathode in one compartment and an anode in the other. In this generator, an electrically neutral or bipolar electrode is employed adjacent to the anode or between the anode and cathode for more rapid start up and generates a mixture of chlorine and chlorine dioxide at both the anode and the neutral electrode.

U.S. Pat. No. 4,439,295 discloses a chlorine generating apparatus employing a pair of concentrically arranged tanks having concentrically arranged access ports with the inner tank being a salt tank and having a perforated portion at the bottom thereof in communication with the anode chamber, and the annulus between the two tanks being a cathode chamber. A salt plug gas trap assembly is removably secured to concentric ports of the two tanks.

U.S. Pat. No. 4,496,452 discloses an electrolytic cell for the electrolysis of a sodium chloride solution including a cathode compartment and an anode compartment. A single conduit at the bottom of the cell charges sodium chloride solution into the compartments and discharges therefrom solutions resulting from electrolysis.

U.S. Pat. No. 4,613,415 discloses an electrolytic cell for generating chlorine gas and caustic and delivering only these products of the electrolytic cell to a swimming pool. A hydrometer is provided in the cathode chamber to signal an excess strength of the catholyte.

SUMMARY OF THE INVENTION

In accordance with the invention claimed, a new and improved chlorine generating device is disclosed for providing uninterrupted generation of chlorine gas. The chlorine generator comprises a novel arrangement of the anode and cathode chambers for serviceability and particularly a unique configuration of the anode and cathode elements per se. The main body of the generator housing the salt and salt brine is semi-translucent, or provided with viewing ports to allow visual indication of the salt level so that the need for salt replenishment can be determined without the use of dip sticks and the like.

It is, therefore, one object of this invention to provide a new and improved electrolytic chlorine generator.

Another object of this invention is to provide an improved porous diaphragm for holding the salt brine separate from the resulting basic solution without interfering with the electrolytic action necessary to generate chlorine gas.

A further object of this invention is to provide an improved diaphragm formed out of porous ceramic material.

A still further object of this invention is to provide an improved configuration for the anode and cathode chambers in relationship to the salt and brine holding compartment of the generator.

A still further object of this invention is to provide a novel method and an assembly of parts for a chlorine generator which maintains a given water content at all times.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawings, in which.

DESCRIPTION OF THE PREFERRED EMBODIMENT

Figure 1:
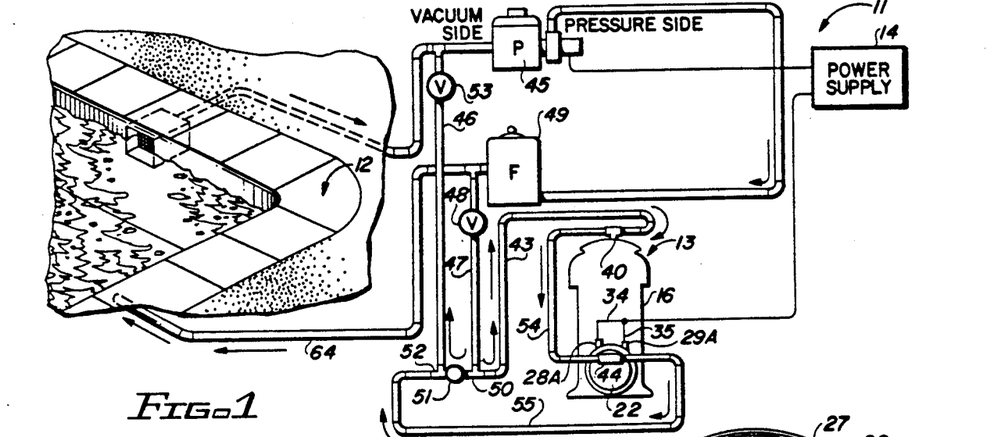
FIG. 1 is a diagrammatic illustration of a chlorine generator in combination with a body of water such as a swimming pool and embodying the invention.

Referring more particularly to the drawings by characters of reference, FIG. 1 discloses an improved chlorination system 11 especially devised for use in the purification of a body of water such as a swimming pool 12, the system comprising an electrolytic chlorine generator 13 with its associated power supply 14.

Figure 2:
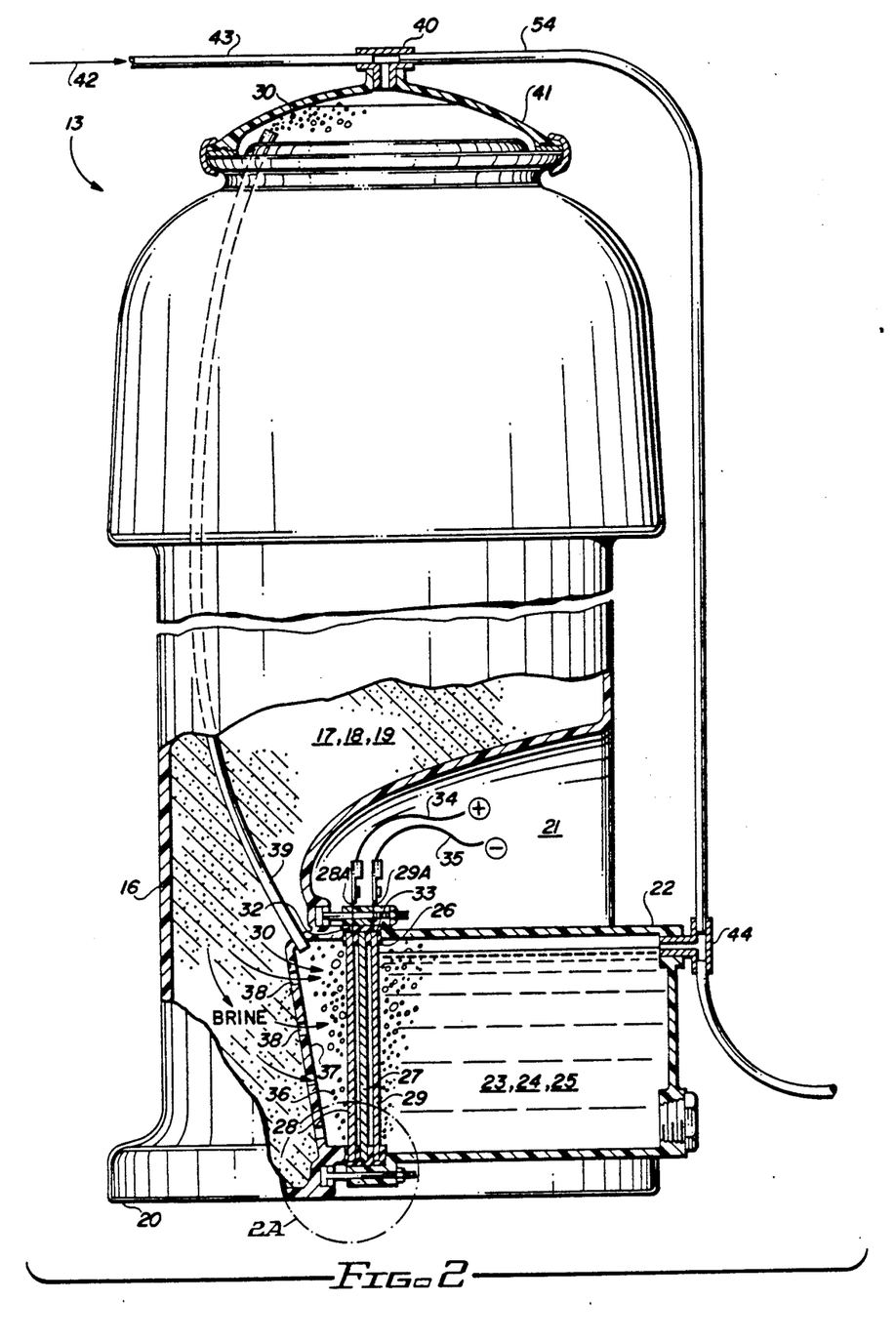
FIG. 2 is a perspective view partially in section of the chlorine generator shown in FIG. 1.
Figure 2A:
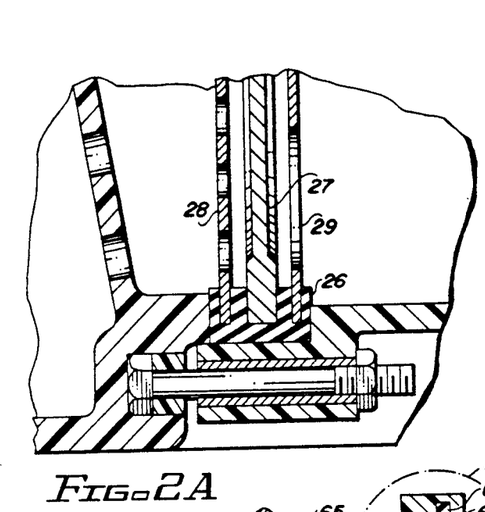
FIG. 2A is an enlargement of the circled area marked 2A of FIG. 2.

The chlorine generator 13 is modeled after the Hooker diagraph cell, the principles of which are well known in the art, but the special construction of generator 13 is adapted to meet the particular needs of the invention. Generator 13 comprises an upright container or main body 16 which may be cylindrical in form for holding salt, water and brine 17, 18 and 19. The lower portion or base 20 of main body 16 of the chlorine generator may be provided with an opening or relief 21 into which a cathode chamber 22 is inserted. The cathode chamber houses sodium hydroxide 23, water 24, and hydrogen gas 25 which is formed in that chamber. Although main body 16 is shown as cylindrical in form, it may assume any other configuration with the cathode chamber attached to its outer periphery and still fall within the scope of this invention.

Assembled between main body 16 and cathode chamber 22 is a circular seal or sealant, herein called membrane seal 26. Mounted in the membrane seal 26 is a porous ceramic membrane 27 which may be, for example, of a disk shaped configuration. On either side of the ceramic membrane 27 are positioned two electrodes, i.e., one being a positive or anode electrode 28, placed on the entrance to main body 16, and the other being a negative charged cathode electrode 29 placed in cathode chamber 22.

The anode electrode 28 is on the main body 16 side of porous ceramic membrane 27 where it can come into contact with the salt brine for generating chlorine gas 30. Cathode electrode 29 faces cathode chamber 22 where it forms hydrogen gas 25 and sodium hydroxide 23.

Figures 3, 3A:
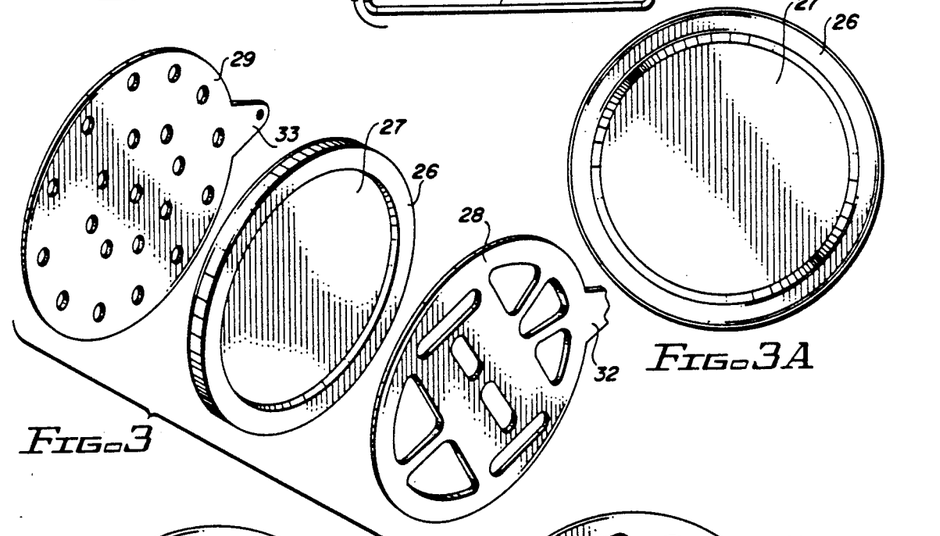
FIG. 3 is an exploded view of the anode, cathode and ceramic membrane of the chlorine generator.
FIGS. 3A-3C are plan views of the ceramic membrane, cathode and anode, respectively, as shown in FIG. 3.
Figure 3B:
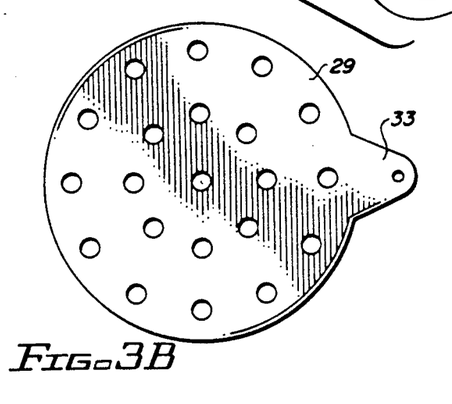
Figure 3C:
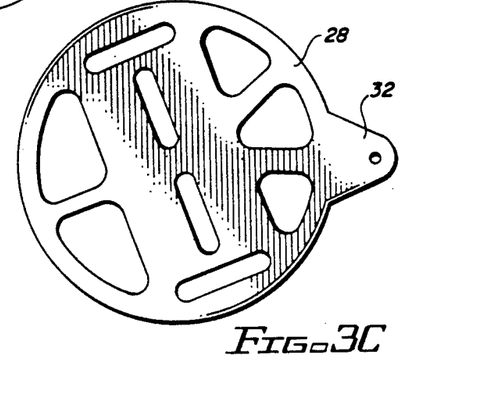

As shown in FIGS. 3 and 3B and 3C, the anode and cathode electrodes are circular in shape having ears, extensions or tabs 32 and 33, respectively, which protrude through membrane seal 26, which seal may be formed, for example, of a rubber or plastic material. These tabs 32 and 33 are exposed outside of main body 16, so that they may be each connected to suitable cables 34 and 35, respectively, which are in turn connected to the positive and negative terminals of power supply 14.

The chlorine gas 30, that is generated at anode electrode 28, bubbles upwardly into a small chamber 36 which segregates anode electrode 28 from the main mass of salt 17 in main body 16 as shown in FIG. 2.

Wall 37 of this small chamber has a plurality of perforations 38 therein which form passageways for the free flow of brine solution 19 but yet keeps the actual crystals of salt 17 from resting against anode electrode 28, which condition would impair or impede the generation of chlorine gas 30. As the bubbles of chlorine gas 30 float upwardly in chamber 36, they collect and accumulate into larger bubbles inside of its top.

In accordance with the teachings of this invention, a tube 39 of polyethelene or other suitable material is provided in chlorine generator 13 for interconnecting the inside of the top of chamber 36 with the inside of the top of main body 16 as shown in FIG. 2. The accumulation of chlorine gas 30 inside of the top of chamber 36 flows through tube 39 to the inside of the top of main body 16 and through a T-coupling, fitting or connection 40 or other form of fluid connector formed at the top of main body 16. As the chlorine gas passes up through tube 39 from chamber 36 it pushes ahead of it spent brine fluid from around anode electrode 28 in chamber 36. The movement of this spent brine fluid draws in fresh brine 19 from main body 16 through perforations 38 in wall 37 of chamber 36.

As chlorine gas 30 accumulates inside of the top of main body 16, it flows through T-connection 40 and into the flowing stream of water 42 being pumped from swimming pool 12 through tube 43, T-connection 40 and T-connection 44 at the back of cathode chamber 22.

The sodium ion is attracted through the porous ceramic membrane 27 into the cathode chamber 22, and is reduced at cathode electrode 29 to form sodium hydroxide 23 with the water 24 and liberates hydrogen gas 25. Hydrogen gas 25 floats to the top of cathode chamber 22 and accumulates into a pocket of gas. The porous ceramic membrane does allow a small amount of water to flow through it based on the pressure differential on each side thereof.

In this situation the water pressure in main body 16 is just slightly greater than the pressure in cathode chamber 22. Due to this pressure differential, water does flow from main body 16 into cathode chamber 22 at a very slow rate. This slow rate of flow through the porous membrane 27 helps prevent back migration of sodium ions that have been pulled by electrical attraction to cathode electrode 29. This condition also prevents migration of the hydroxile ion that is associated with the sodium ion. This hydroxile ion, being the same charge electrically as the chlorine ion, is attracted to the anode electrode 28 and with this small flow of water in the direction from main body 16 through ceramic membrane 27 to the cathode chamber 22 helps prevent or impede the back migration of the hydroxile ion towards the anode electrode 28. If the hydroxile ion is allowed to migrate to the anode electrode, it would replace the generation of chlorine with the generation of oxygen, and this oxygen generation can damage the special coating on the anode electrode. Thus, by having this slight differential pressure between main body 16 and cathode chamber 22, a tendency for water flow from main body 16 into cathode chamber 22 occurs with the resulting impedance of the back migration of the hydroxile ion. This feature rendered the chlorine generator more efficient.

Due to the flow of water into cathode chamber 22 from main body 16, there is a need for water to flow out of the cathode chamber 22 along with the hydrogen gas 25 that is created at the cathode electrode 29, and this is accomplished through T-connection 44 that is connected to the cathode chamber 22. This flow of water helps to reduce the concentration of the sodium hydroxide 23 in the cathode chamber 22. It is important to maintain a low concentration of sodium hydroxide 23 to help prevent hydroxile ions from migrating back to anode electrode 28. The lower the concentration of sodium hydroxide in the cathode chamber, the lower the number of hydroxile ions trying to migrate back to the anode electrode. This configuration will cause a sufficient concentration of sodium hydroxide causing a balanced electrical conductivity in the chlorine generator 13.

One important feature of the disclosed chlorine generator is that main body 16 remains full of water at all times. Prior art chlorine generators are designed so that the owner has to manually add water to the salt to provide the brine. The disclosed structure causes water to dribble through T-connection 40 into the small gas pocket created at the top of lid 41 of main body 16 where the chlorine gas 30 accumulates; and this small dribbling of water 42 causes the interior of main body 16 to remain full of water at all times. The same is true of the cathode chamber 22 which stays full of water because of water passing into the cathode chamber 22 through T-connection 44 that is attached to the cathode chamber 22. The automatic filling of water into main body 16 and cathode chamber 22 is important because of the amount of electrical current that is being generated at the electrodes causing heat and this heat causes evaporation of the water. If the generator was not designed to remain full of water at all times, the water would eventually evaporate off and the unit would stop functioning.

Another important feature of disclosed chlorine generator 13 is the way in which it is connected to the body of water to be treated with chlorine gas. Swimming pool 12 or any other body of water, as shown in FIG. 1, has a pump 45 which circulates the water through a filter system 49 to remove foreign particles introduced into the body of water. This pump is normally of a centrifugal variety which generates numerous continuous pressure pulsations. If a pressure gauge is connected on the pressure side of this centrifugal pump, as is common with swimming pools, a slight vibration or pulsing action of the pressure gauge needle is noted.

By connecting a small tube 46 to the vacuum side and a small tube 47 to the pressure side of this pump, we create a water flow through the tubes and as this water flow is carried to the chlorine generator 13 and comes in contact with the T-connection 40, first at the top of the chlorine generator 13 and then secondly in contact with the T-connection 44 attached to the cathode chamber 22, these small continuous pressure pulsations are felt by the gas pockets of the chlorine gas 30 and the hydrogen gas 25 in the chlorine generator 13. Gas being much more compressible than fluids will condense and expand when the pressure pulsations caused by pump 45 go up or down. The gas pockets formed in the chlorine generator 13 will condense or become smaller with a rise in pressure and as their volumes become smaller more water flows from tube 43 through the T-connections 40 and 44 into the interior of main body 16 and cathode chamber 22 as heretofore explained. As the pressure pulsation goes more negative or less pressure, the gas pockets will expand and now because water has come in to fill up the space previously occupied by the gas, the expanding gas bubble has nowhere to go but out the T-connections 40 and 44, to mix with the flowing water in tube 43 that flows across the gap of the T-connections 40 and 44. In this manner, using these pressure pulsations of pump 45, the gas pockets in the chlorine generator are caused to expand and condense on a regular basis and this provides for water to flow into the cavity in main body 16 and cathode chamber 22 and as the gas pocket in main body 16 expands, it forces the chlorine gas 30 out into the flowing water stream 42 that is flowing through tube 43. In this manner main body 16 and cathode chamber 22 remain full of water and the chlorine gas 30, and hydrogen gas 25 that are generated are expelled from the main body 16 and the cathode chamber 22. This is a very unique feature of this invention.

As shown in FIG. 1, a valve 48 is connected to the pressure side of pump 45 downstream from a filter 49. Water flows through valve 48 toward a T-connection 50 and at T-connection 50 through a short circuit bypass conduit 51 which may have a restrictive orifice therein which causes the water to flow through a T-connection 52 toward and through tube 46 and optional valve 53 to the vacuum side of pump 45. This creates a continuous flow of water from the pressure side of pump 45 to the vacuum side of the pump. At T-connection 50 some of the water flows through tube 43, T-connection 40 and into body 16 of the chlorine generator, through tube 54, T-connection 44, tube 55, T-connection 52, valve 53 and to the vacuum side of pump 45. The chlorine gas that is mixed with the flowing water in tubes 43, 54, 55 and 46 is dissolved along its route. Any chlorine that is not dissolved by the time it gets back to pump 45 is further dissolved by the high speed churning and agitating action of the pump. It is this slightly higher concentration of chlorine in the flowing water that insures satisfactory disinfection.

By increasing the chlorine concentration of the water flowing through the pump to a higher concentration than would normally be found in a body of water or swimming pool 12, the chlorine can do a more effective sanitizing job on the water that is flowing through the pump and filtration system. Also, a small amount of sodium hydroxide 23, which builds up in cathode chamber 22 to a high pH rating is expelled from cathode chamber 22 on a continuous, regular basis. This high pH sodium hydroxide solution mixes with the water and the chlorine gas flowing in the tubing. The chlorine, when mixed in the water, produces hypochlorous acid, i.e., a bacterial killing agent, and hydrochloric acid, a low pH acid. This hydrochloric acid and the sodium hydroxide mix together and neutralize each other, so in effect the chlorine generator is producing an acid and a base compound which neutralize each other. This is a beneficial side effect of the claimed design.

As noted in FIG. 1, valve 48, connected to the pressure side of the pump, regulates the pressure between the pressure side of the pump and where the tubing connects to the vacuum side of the pump. By controlling valve 48, the pressure in the small circulating water path from valve 48 through pipes 47, 43, 54, 55 and 46 to the vacuum side of the pump may achieve a pressure in this path which is atmospheric by balancing the positive pressure on the positive side of the pump with the negative pressure on the vacuum side of the pump yet still accomplishing water flow through this path. In this manner the chlorine generator may be inserted into the circulating water system of the pump without having a high pressure or a low pressure vacuum condition applied to main body 16 of the chlorine generator. If the pressure is kept at atmosphere, the chlorine generator does not have to withstand the rigors of high or low pressure conditions.

The chlorine gas is evolved more freely if the pressure is kept at atmosphere and this is one benefit of having this type of installation. The water flowing to and from the chlorine generator, during its operation carries away the generated chlorine gas together with the sodium hydroxide produced. Therefore, the chlorine generator is operated simultaneously with the operation of the pump and these devices are connected electrically so as to be simultaneously energized.

Using an alternate installation method, the chlorine generator can be operated without the need for water flowing to and from it. The chlorine gas generated will bubble to the top of main body 16 and be collected under lid 41. The hydrogen gas will flow to the top of the cathode chamber and then outward through a fitting hole to atmosphere. As the salt is depleted, the space which it occupies will be reduced and the level of the water in the main body will drop. Also, due to the heat of electrolysis, some of the water will be evaporated from the main body 16 and in this mode the water level in the main body 16 will, over time, be lowered and will eventually require being refilled in order for it to have sufficient water to carry out electrolysis. With the T-connection 40 at the lid of the main body opened to the atmosphere, differential pressure created by the height of the water in the main body 16 would cause water to flow through a porous ceramic membrane 27 into cathode chamber 22 and then out T-connection 44 at the back of the cathode chamber.

This flow of water would cause a reduction of the concentration of sodium hydroxide 23 in the cathode chamber 22 which is a beneficial feature. In this manner the chlorine generator could be operated without being connected to a pump. The sodium hydroxide 23 would flow out of the cathode chamber 22 as a result of the differential pressure between main body 16 and cathode chamber 22. The resulting flow of sodium hydroxide would need to be either collected or conducted to a drain.

Construction of Parts

Main body 16 of chlorine generator 13 is produced by a rotational molding process, using a polyolefin plastic. This polyolefin plastic has the properties of chemical resistance and translucency, which are both important for this product. Chemical resistance of the parts is important to resist the deteriorating effects of the generated chlorine gas and the translucency feature is important to allow the user to observe the level of salt contained within main body 16 without opening its lid to determine if the salt needs to be replenished. An alternate method of using port windows which are transparent while using opaque body material may be employed in manufacturing main body 16.

The anode electrode 28 is made from titanium. A portion of the anode electrode 28 may have a coating either applied to it or an additional strip of coated titanium may be spot welded to the anode. The coating on the titanium is composed of titanium dioxide and ruthenium or iridium oxide.

The cathode electrode 29 can be made from any suitable metal or conductive ceramic. One such conductive ceramic is produced by Ebonex Technologies, Inc. of Emeryville, Calif. Titanium, nickel, stainless steel or hastelloy alloy may be used.

The porous ceramic membrane 27 may comprise pure aluminum oxide ceramic that is rendered porous by the way in which it is processed. It is produced by firing the ceramic up to a certain point which allows some sintering, but not complete sintering, thereby remaining partially porous. Pore forming material may be added before firing. Alumina ceramic can be replaced with other types of ceramic for this application, such as titania, which is rendered partially porous through its processing. A combination of alumina or berylia or titania or other suitable ceramics that are impervious to the low pH chlorine brine solution and high pH sodium hydroxide solution would be suitable. The most important factor being that its porosity needs to be kept to a very fine pore structure to help prevent back migration of the hydroxile ion and to limit the amount of actual water flow through the ceramic membrane from the main body 16 to the cathode chamber 22. This is controlled by the pore size and pore volume content of the ceramic.

The ceramic membrane 27 requires 35% or less pore volume (apparent porosity), ideally within the range of 15% to 25% pore volume. The nominal pore size should be 0.5 micron or smaller, ideally within the range of 0.05 to 0.2 micron pore size. The pore volume, pore size, and thickness of the ceramic membrane can be varied to achieve an electro-chemical reaction rate sufficient to fill the need for liberated chlorine. The rate of chlorine production will increase as the pore size is made larger, will increase as the pore volume is made larger, and will increase as the thickness of the ceramic membrane is made thinner.

An alternate membrane material would be a cation semi-permeable membrane which will allow the sodium ion to pass through the membrane in one direction and resist the back migration of the sodium ion in the opposite direction. An example of this membrane is trade named NAFION manufactured by Dupont.

Reference is made to the description, method of manufacture and benefits of a similar porous ceramic membrane found in U.S. Pat. No. 4,248,715 which is incorporated herein by reference.

An alternate configuration for the electrodes would entail plasma or flame spraying a material onto the surface of the ceramic membrane which would act as an electrode media, both for the anode on one side and the cathode on the opposite side of the ceramic membrane.

It should be noted that the electrodes can be shaped differently and pass through the walls of the generator to the electrical cable attachment points by rod or strip method and fall within the scope of this invention.

Installation

In FIG. 1 the tubing or pipe attachments of the chlorine generator to the pump system employing the short circuit line between the T-connection 50 and the T-connection 52 provides water flow in that direction in the event that there might be plugging or blockage in the remainder of the tubing that would flow to and from the chlorine generator. If there was a blockage in pipe lines 43, 54 or 55 it might create either a vacuum or high pressure condition on main body 16 of the generator. By having this short circuit line, a high pressure or vacuum condition would not develop on the main body of the chlorine generator. Water will flow through this short circuit line, and the chlorine and hydrogen gases generated during this condition will build up sufficient pressure to push the water ahead of it, through tubes 43 or 55 until the chlorine and hydrogen gases mix with the water flowing through the T-connections 50 and 52 thereby maintaining chlorine gas administration to the water even though there might be a blockage in the tubing to and from the chlorine generator. Thus, there are two routes for the gas to follow. If tube 43 leading to the chlorine generator is blocked, the gases will flow through tube 55 leading away from the chlorine generator. If tube 55 leading away from the chlorine generator is blocked, then the gases will flow through tube 43 leading to the chlorine generator.

Figures 5, 7:
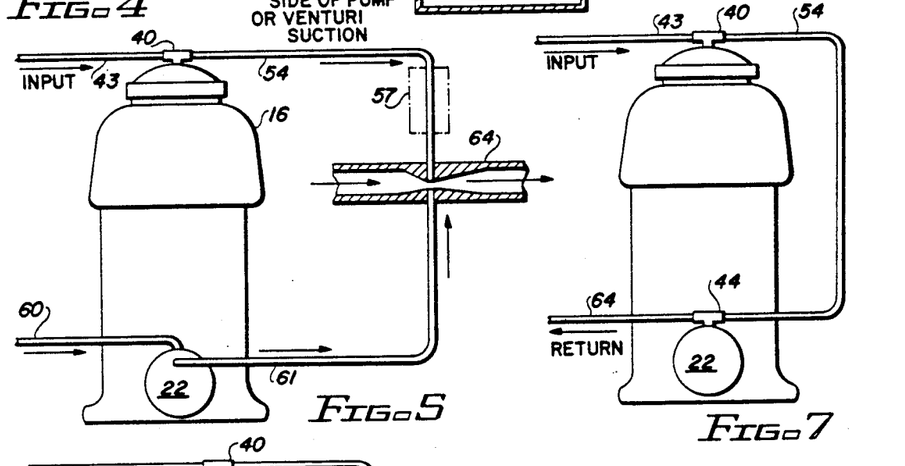
FIG. 5 is a diagrammatic illustration of the chlorine generator employing a venturi suction arrangement for use with or without an absorption column.
FIG. 7 is a diagrammatic illustration of the chlorine generator shown in FIG. 4 employing a flow back system to the pool.

An alternate method of installation of the tubing that carries water to and from the chlorine generator as shown in FIG. 7, would be to have the water flow to T-connection 40, then down to T-connection 44 at cathode chamber 22, and then from there flowing on to a point of discharge at atmospheric pressure instead of returning to the suction side of pump 45.

Another alternative method of installing the chlorine generator would be to use a small auxiliary pump (not shown) which is connected to the body of water that would turn on and off with the chlorine generator causing water to flow through T-connection 40 and then through T-connection 44 at the cathode chamber 22, and then either discharge the water into an open body of water such as the swimming pool or back to the suction side of this small auxiliary pump. In this method the auxiliary pump and the chlorine generator can be operated 24 hours a day or any given time period that is required at a different interval than the swimming pool pump filtration system. The swimming pool filtration system could be operated six hours a day with the chlorine generator operated 12 hours a day to give sufficient chlorine to sanitize the pool water. This type of system would be a free standing, self-contained installation not dependent on the pump filtration system of the swimming pool.

Figure 4:
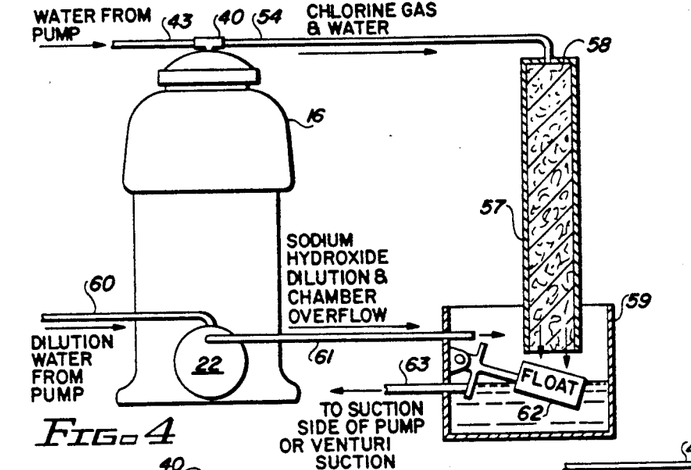
FIG. 4 is a diagrammatic illustration of the chlorine generator employing trickle absorpotion system.

FIG. 4 discloses a modification of the use of the chlorine generator employing a means for preventing the concentration or build up of sodium hydroxide in the cathode chamber. As water from the pump is passed through T-connection 40 in the manner heretofore explained, it picks up chlorine gas and the water and chlorine gas trickle through a column 57 filled with plastic netting, pebbles, ceramic chips 58 and the like to aid the water in absorbing the chlorine gas. This water is discharged into a float bowl or chamber 59 which discharges the chlorinated water to the suction side of pump 45.

As noted in FIG. 4 dilution water is dripped into the cathode chamber 22 from a drip system 60 which may comprise an orifice in cathode chamber 22 or hydrometer actuated valve or water diverter, not shown in this figure. The overflow from the cathode chamber 22 is transmitted through pipe or tube 61 to drip into the float bowl 59. A float 62 controls the outlet 63 of the float bowl as shown.

FIG. 5 shows a modification of the connection of the chlorine generator shown in FIG. 4 to a water system. As shown, absorption column 57 may or may not be used with a mixture of water and chlorine gas being transmitted into the stream of water flowing through tube 64 into swimming pool 12.

As noted, excess sodium hydroxide overflowing from cathode chamber 22 is drawn by venturi action from cathode chamber 22 into tube 64.

Figure 6:
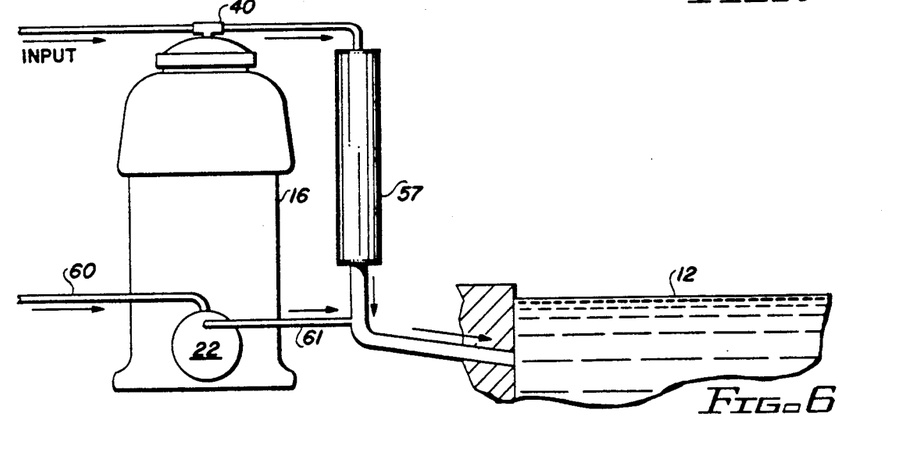
FIG. 6 is a modification of the diagrammatic illustration of FIG. 4.

FIG. 6 is a further modification of the connection of the chlorine generator to the swimming pool system as shown in FIG. 4 wherein the water mixed with the chlorine gas from main body 16 of the generator is mixed with the excess sodium hydroxide from cathode chamber 22 and fed back into swimming pool 12.

FIG. 7 illustrates a still further modification of the connection of the chlorine generator 16 to the swimming pool system wherein the pool water through tube 43 is passed through T-connection 40, tube 54, T-connection 44 associated with cathode chamber 22 and back through tube 64 to swimming pool 12.

It is important to limit or prevent the concentration or build-up of the sodium hydroxide in the cathode chamber. The rate of chlorine liberation will decrease if sodium hydroxide is allowed to become too concentrated. As the concentration of sodium hydroxide approaches zero, the rate of electrochemical reaction will decrease. A method of diluting the sodium hydroxide is required either manually or automatically. Automatic dilution can be performed by the use of a hydrometer which becomes more buoyant as the concentration of sodium hydroxide increases. The greater buoyancy will cause the hydrometer device to rise or float higher in the catholyte solution thereby triggering a valve or diverting water flow to enter into the cathode chamber causing dilution of the sodium hydroxide as shown in FIGS. 8-13. A higher concentration of sodium hydroxide will increase the electrochemical reactivity but the rate of chlorine production will fall with increased concentration of sodium hydroxide due to back-migration of the hydroxile ion which can take the place of the chlorine ion at the anode. This side reaction uses electricity which should be used to produce chlorine, thereby lowering the chlorine production and subsequent efficiency of the chlorine generator. It is preferred to keep the sodium hydroxide concentration from about 5% up to about 20%.

Figure 8:
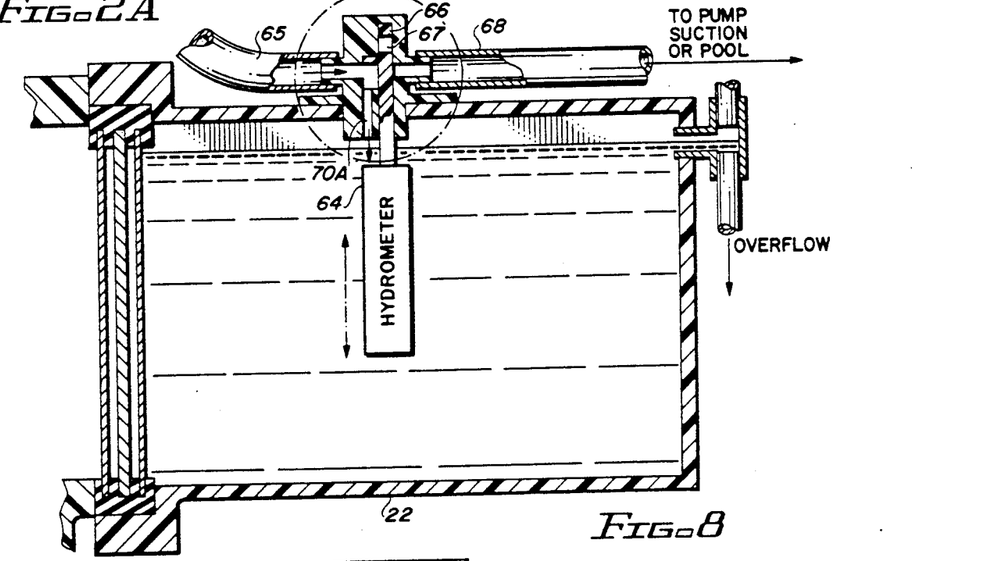
FIG. 8 is a modification of the cathode chamber employing a hydrometer for controlling water flow through the generator.
Figure 9:
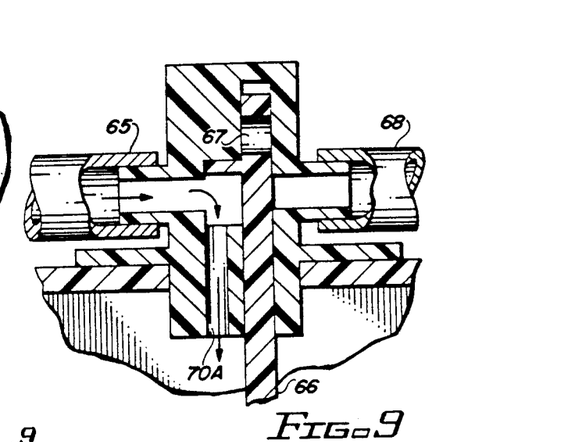
FIG. 9 is an enlargement of the circled area marked 9 of FIG. 8.
Figure 10:
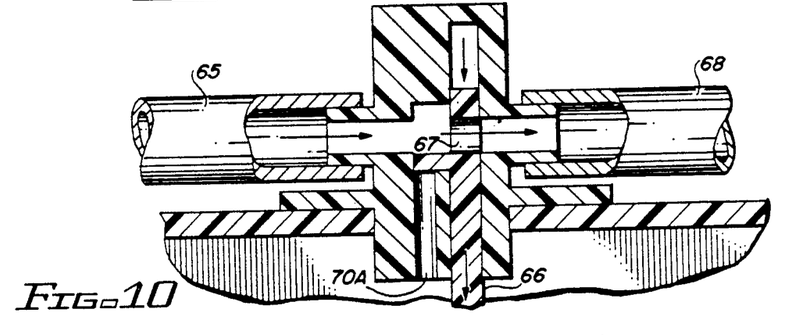
FIG. 10 is another view of the structure shown in FIG. 9.

FIGS. 8-10 disclose a hydrometer automatic dilution system wherein dilution is caused by a hydrometer 64 rising and interfering with a small stream of water flowing under pressure through tubes 65 and 68.

It should be noted that water squirts through a small hole 67 in stem 66 of hydrometer 64 when hole 67 in the stem 66 of hydrometer 64 is aligned with the water stream. The water in tube 68 on the opposite side of stem 66 from hole 67 is conducted back to the suction side of the pump or to swimming pool 12. As hydrometer 64 rises in cathode chamber 22 due to an increase in sodium hydroxide 23 concentration, the water stream from tube 65 will hit stem 66 as shown in FIG. 8 and drip through port 70A and air gap 70 into cathode chamber 22 diluting the sodium hydroxide 23 in cathode chamber 22 which will cause the hydrometer 64 to lower and align hole 67 with the water stream which will retard dilution of sodium hydroxide 23.

Figure 11:
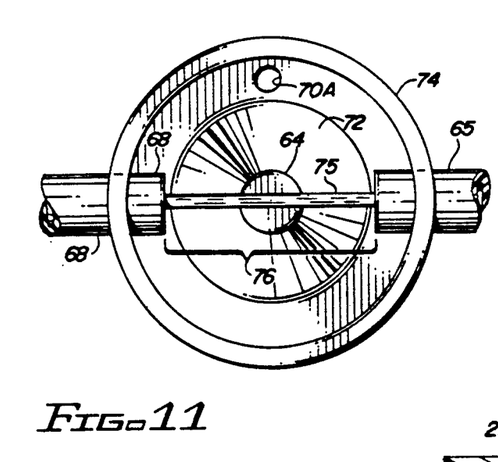
FIG. 11 discloses a modification of the hydrometer configuration shown in FIGS. 8-10.
Figure 12:
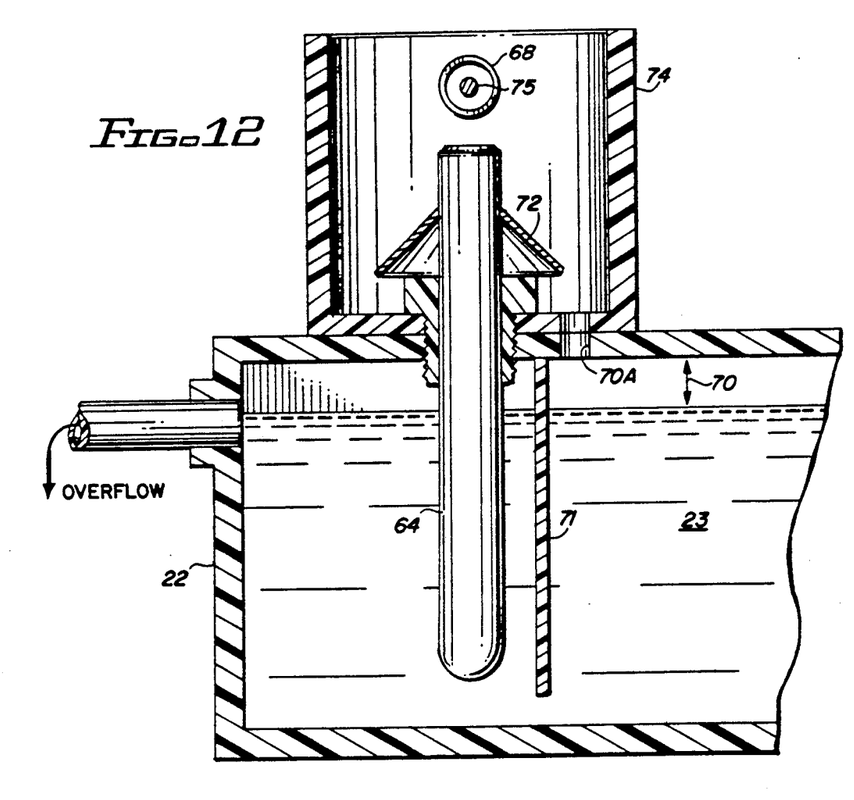
FIG. 12 is a top view of FIG. 11.
Figure 13:
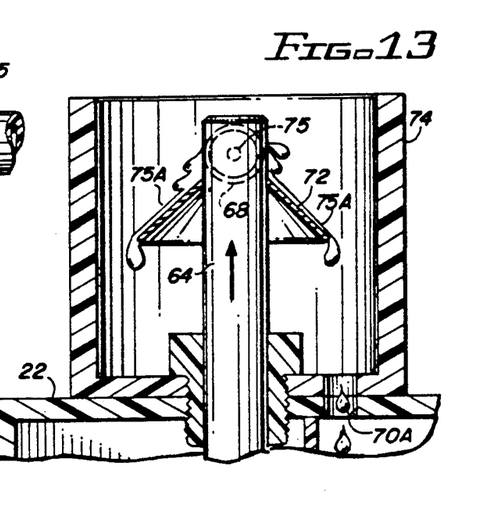
FIG. 13 is a view similar to FIG. 12 with the hydrometer blocking the water flow through the system.

FIGS. 11-13 disclose a further modification of the hydrometer automatic dilution system shown in FIGS. 8-10 wherein like parts are given the same reference characters.

As shown, hydrometer 64 is shelter by a shield 71 which may comprise a barrier wall or cylinder extending around the hydrometer for limiting the concentration, depositing or adhering of gaseous bubbles to the hydrometer, thereby affecting its movement up and down in chamber 74.

Hydrometer 64 is provided with a skirt 72 which diverts water droplets 75A obtained from a stream of water 75 flowing between tubes 65 and 68 as shown in FIGS. 11 and 13.

When the sodium hydroxide 23 in cathode chamber 22 is of a proper dilution the fresh water from tube 65 will flow from tube 65 to tube 68 across gap 76 between them. When the concentration of sodium hydroxide 23 is too great the hydrometer will rise in cathode chamber 22 blocking the flow of water from tube 65 to tube 68 causing a flow of water through port 70A and air gap 70 into the cathode chamber, as shown.

This hydrometer provides benefits not obtained by previous methods by diverting the dilution water 75A so that it does not enter the sodium hydroxide solution by flowing down the hydrometer where it can cause mineral deposits and encrustation upon the hydrometer. This action will add weight throwing the hydrometer out of calibration and possibly binding the hydrometer into the through hole bushing through which the hydrometer travels up and down.

Although but a few embodiments of the present invention have been illustrated and described, it will be apparent to those skilled in the art that various changes and modifications may be made therein without departing from the spirit of the invention or from the scope of the appended claims.

What is claimed is:

1. An electrolytic cell for generating gaseous chlorine comprising:
   a main body for containing therein a concentrated aqueous solution of a metallic chloride.
   an open ended anode chamber communicating with the main body,
   a cathode chamber having an open end,
   a membrane means sealing the open end of said cathode chamber with the open end of said anode chamber,
   said membrane means at least partially comprising a semi-permeable material,
   an anode mounted adjacent said membrane means in said anode chamber for contact with said aqueous solution,
   a cathode mounted adjacent said membrane means in said cathode chamber and being in communication with said anode chamber through said semi-permeable material,
   a first means for supplying a DC voltage across said anode and said cathode to produce gaseous chlorine in said anode chamber,
   a second means for discharging chlorine gas from the inside of said main body, and
   a third means for discharging gaseous hydrogen and liquid sodium hydroxide from said cathode chamber,
   said semi-permeable material comprises a porous ceramic material.

2. The electrolytic cell set forth in claim 1 wherein: said semi-permeable material comprises a cation membrane.

3. The electrolytic cell set forth in claim 1 wherein: said third means discharges gaseous hydrogen and sodium hydroxide from said cell into a water flowing system.

4. The electrolytic cell set forth in claim 1 wherein: said anode and said cathode comprises a substantially flat configuration each having an extension for electrical attachment to said first means.

5. The electrolytic cell set forth in claim 1 wherein: said anode chamber is in communication with said main body by means of a perforated wall separating the interior of said main body from the interior of said anode chamber,
whereby a brine solution formed in said main body may be drawn through the perforations in said wall to replenish the spent brine solution in said anode chamber.

6. The electrolytic cell set forth in claim 1 wherein: said third means comprises a hollow fitting having one opening forming an inlet to a water flowing system, another opening forming an outlet for said water flowing system and a third opening connected to the inside of said cathode chamber for drawing sodium hydroxide from said cathode chamber into said water flowing system.

7. A water sterilizing apparatus in combination with a body of water having a water recirculation system that includes a pump, suction line extending from said body of water to said pump, an electric motor which drives said pump and a discharge line that returns water from said pump to said body of water, which apparatus comprises:
   a main body for containing therein an electrolytic cell for generating chlorine gas within a confined space therein,
   a hollow fitting connected to said cell having a first inlet opening in fluid contact with said confined space, a second outlet opening in fluid contact with said suction line and a third inlet opening in fluid contact with said discharge line, a cathode chamber having an open end opening into said confined space, an anode chamber having an open end, a membrane means at least partially made from porous ceramic material, mounted to occupy and seal the space between said open end of said cathode chamber and said open end of said anode chamber, an anode mounted adjacent said membrane means in said anode chamber for contact with an aqueous solution in said confined space, a cathode mounted adjacent said membrane means in said cathode chamber and being in communication with said anode chamber through the material of said membrane means, a means for supplying a DC voltage across said anode and said cathode to produce gaseous chlorine in said anode chamber, and a conduit extending from said anode chamber to the inside of said main body for discharging gaseous chlorine from said anode chamber into said main body.

8. The water sterilizing apparatus set forth in claim 7 wherein:
said membrane material is at least partially made from a cation material.

9. The water sterilizing apparatus set forth in claim 7 in further combination with:
a discharge means connected to said cathode chamber for discharging gaseous hydrogen and sodium hydroxide from said cell into said water recirculation system.

10. An electrolytic cell for generating gaseous chlorine comprising:
a substantially vertical positioned main body for containing therein a concentrated aqueous solution of a metallic chloride, an open ended anode chamber at the base of said main body, an open ended cathode chamber, said main body having a cavity formed therein adjacent its base for receiving therein said cathode chamber in a fluid tight arrangement, said cathode chamber's open end opening into said cavity, a membrane means sealing the open end of said cathode chamber with the open end of said anode chamber, said membrane at least partially comprising a porous ceramic material, an anode mounted adjacent said membrane means in said anode chamber for contact with said aqueous solution, a cathode mounted adjacent said membrane means in said cathode chamber and being in communication with said anode chamber through pores in said ceramic material, a first means for supplying a DC voltage across said anode and said cathode to produce gaseous chlorine in said anode chamber, a conduit extending from said anode chamber to the inside of said main body for discharging gaseous chlorine from said anode chamber, a second means for discharging gas from the top of said main body into a water flowing system, and a third means extending from said cathode chamber for discharging sodium hydroxide from said cell.

11. The electrolytic cell set forth in claim 10 wherein:
said cathode chamber is cylindrical in form.

12. The electrolytic cell set forth in claim 10 wherein:
said third means discharges gaseous hydrogen and sodium hydroxide from said cell into said water flowing system.

13. The electrolytic cell set forth in claim 10 wherein:
said anode and said cathode comprise a substantially flat configuration each having an extension for electrical attachment to said first means.

14. The electrolytic cell set forth in claim 10 wherein:
said anode chamber is defined by a perforated wall separating the interior of said main body from the interior of said anode chamber, whereby a brine solution formed in said main body may be drawn through the perforations in said wall to replenish the spent brine solution in said anode chamber.

15. The electrolytic cell set forth in claim 10 wherein:
said second means comprises a hollow fitting having one opening forming an inlet to said water flowing system, another opening forming an outlet for said water flowing system and a third opening connected to the inside of the top of said main body for receiving gaseous chlorine from said main body for injection into said water flowing system.

16. The electrolytic cell set forth in claim 10 wherein:
said third means comprises a hollow fitting having an opening forming an inlet to said water flowing system, another opening forming an outlet for said water flowing system and a third opening connected to the inside of said cathode chamber for drawing sodium hydroxide from said cathode chamber into said water flowing system.

17. A water sterilizing apparatus in combination with a swimming pool having a water recirculation system that includes a pump, a suction line extending from the interior of said pool to said pump, and electric motor which drives said pump in a pulsating manner and a discharge line that returns water from said pump to said pool, which apparatus comprises:

an electrolytic cell for generating chlorine gas within a confined space therein, a hollow fitting connected to said cell having a first inlet opening in fluid contact with said confined space, a second inlet opening and a third inlet opening, a first fluid conducting line connecting said second inlet opening to said discharge line, a second fluid conducting line connecting said third outlet opening to said suction line, wherein water from said pump flowing through said first fluid conducting line in a pulsating manner continuing into said second inlet opening and out of said third outlet opening and into said second fluid conducting line draws chlorine gas from said confined space into the water flowing through said fitting for water chlorinating purposes and adds water to said cell to replace chlorine gas drawn therefrom to maintain a given water level in said cell, a substantially vertically positioned main body for containing therein a concentrated aqueous solution of a metallic chloride, an open ended anode chamber in the base of said main body, an open ended cathode chamber, said main body having a cavity formed therein adjacent its base for receiving therein said cathode chamber in a fluid tight arrangement, said cathode chamber having its open end connected to said cavity,
a membrane means sealing the open end of said cathode chamber with the open end of said anode chamber,
said membrane means at least partially comprising a porous ceramic material,
an anode mounted adjacent said membrane means in said anode chamber for contact with said aqueous solution,
a cathode mounted adjacent said membrane means in said cathode chamber and being in communication with said anode chamber through said ceramic material,
a means for supplying a DC voltage across said anode and said cathode to produce gaseous chlorine in said anode chamber, and
a conduit extending from said anode chamber to said main body for discharging gaseous chlorine from said anode chamber.

18. The water sterilizing apparatus set forth in claim 17 in further combination with:
a third fluid conducting line interconnecting said first fluid conducting line and second fluid conducting line.

19. The water sterilizing apparatus set forth in claim 18 in further combination with:
a valve in said third fluid conducting line to control the pressure/vacuum applied to said fitting.

20. The water sterilizing apparatus set forth in claim 17 wherein:
said membrane means comprises a cation material.

21. The water sterilizing apparatus set forth in claim 17 in further combination with:
a discharge means connected to said cathode chamber for discharging sodium hydroxide from said cell into a fluid conducting line.

22. An apparatus for supplying chlorine and sodium hydroxide to swimming pool water for purification thereof comprising:
an electrolytic cell comprising a substantially closed housing, divider wall means in said housing for separating said cell into an anode chamber with an anode therein and a cathode chamber with a cathode therein, an opening through said wall means, a cation membrane across said opening,
said cathode chamber having an overflow conduit extending therefrom and a water inlet conduit extending thereinto,
a dual purpose hydrometer means for indicating the strength of catholyte in said cathode chamber and for controlling the flow of water through said inlet and into said cathode chamber,
thereby when the concentration of said catholyte is below a predetermined value said hydrometer will extend further into said catholyte and water will not flow from said water inlet conduit into said cathode chamber and when the concentration of said catholyte is above a predetermined value said hydrometer means will extend further outwardly of the surface of the catholyte to substantially block the flow of water, diverting it into said cathode chamber, the diverted water will enter the catholyte at a distance from the hydrometer in a manner to not allow mineral precipitation to occur on the hydrometer as does happen when the water is allowed to enter the catholyte by running down the length of the hydrometer.

23. The water sterilizing apparatus set forth in claim 22 in further combination with:
a porous barrier positioned at least partially around said hydrometer means for preventing bubbles in said cathode chamber from collecting on said hydrometer.

24. An electrolytic cell for generating gaseous chlorine comprising:
a main body for containing therein a concentrated aqueous solution of a metallic chloride,
an open ended anode chamber communicating with the main body,
a cathode chamber having an open end,
a membrane means sealing the open end of said cathode chamber with the open end of said anode chamber,
said membrane means at least partially comprising a semi-permeable material,
an anode mounted on said membrane means in said anode chamber for contact with said aqueous solution,
a cathode mounted on said membrane means in said cathode chamber and being in communication with said anode chamber through said semi-permeable material,
a first means for supplying a DC voltage across said anode and said cathode to produce gaseous chlorine in said anode chamber,
a second means for discharging chlorine gas from the inside of said main body, and
a third means for discharging gaseous hydrogen and liquid sodium hydroxide from said cathode chamber.

25. An electrolytic cell for generating gaseous chlorine comprising:
a main body for containing therein a concentrated aqueous solution of a metallic chloride,
an open ended anode chamber communicating with the main body,
a cathode chamber having an open end,
a membrane means sealing the open end of said cathode chamber with the open end of said anode chamber,
said membrane means at least partially comprising a semi-permeable material,
an anode mounted adjacent said membrane means in said anode chamber for contact with said aqueous solution,
a cathode mounted adjacent said membrane means in said cathode chamber and being in communication with said anode chamber through said semi-permeable material,
a first means for supplying a DC voltage across said anode and said cathode to produce gaseous chlorine in said anode chamber,
a second means for discharging chlorine gas from the inside of said main body,
a third means for discharging gaseous hydrogen and liquid sodium hyroxide from said cathode chamber,
said main body being formed to provide a cavity adjacent its base, and
said cathode chamber being mounted in said cavity.

26. An electrolytic cell for generating gaseous chlorine comprising:
a main body for containing therein a concentrated aqueous solution of a metallic chloride, an open ended anode chamber communicating with the main body, a cathode chamber having an open end, a membrane means sealing the open end of said cathode chamber with the open end of said anode chamber, said membrane means at least partially comprising a semi-permeable material, an anode mounted adjacent said membrane means in said anode chamber for contact with said aqueous solution, a cathode mounted adjacent said membrane means in said cathode chamber and being in communication with said anode chamber through said semi-permeable material, a first means for supplying a DC voltage across said anode and said cathode to produce gaseous chlorine in said anode chamber, a second means for discharging chlorine gas from the inside of said main body, and a third means for discharging gaseous hydrogen and liquid sodium hydroxide from said cathode chamber, at least a part of said main body being transparent for observing the salt content therein.

27. An electrolytic cell for generating gaseous chlorine comprising:

a main body for containing therein a concentrated aqueous solution of a metallic chloride, an open ended anode chamber communicating with the main body, a cathode chamber having an open end, a membrane means sealing the open end of said cathode chamber with the open end of said anode chamber, said membrane means at least partially comprising a semi-permeable material, an anode mounted adjacent said membrane means in said anode chamber for contact with said aqueous solution, a cathode mounted adjacent said membrane means in said cathode chamber and being in communication with said anode chamber through said semi-permeable material, a first means for supplying a DC voltage across said anode and said cathode to produce gaseous chlorine in said anode chamber, a second means for discharging chlorine gas from the inside of said main body, and a third means for discharging gaseous hydrogen and liquid sodium hydroxide from said cathode chamber, said second means comprising a hollow fitting having one opening forming an inlet to a water flowing system, another opening forming an outlet for said water flowing system and a third opening connected to the inside of said main body for receiving gaseous chlorine from said main body for injection into said water flowing system.

28. An apparatus for supplying chlorine to water for purification thereof comprising:

an electrolytic cell comprising a housing, divider wall means in said housing for separating said cell into an anode chamber with an anode therein and a cathode chamber with a cathode therein, an opening through said wall means, a membrane across said opening, said cathode chamber having an overflow conduit extending therefrom and a water inlet conduit extending thereto, a dual purpose hydrometer means for indicating the strength of catholyte in said cathode chamber and for controlling the flow of water through said inlet and into said cathode chamber, Whereby when the concentration of said catholyte is below a predetermined value said hydrometer will restrict water from flowing from said water inlet conduit into said cathode chamber and when the concentration of said catholyte is above a predetermined value said hydrometer means will cause water to flow from said water inlet conduit into said cathode chamber, the water will enter the catholyte at a distance from the hydrometer in a manner to not allow mineral precipitation to occur on the hydrometer as does happen when the water is allowed to enter the catholyte by running down the length of the hydrometer.

* * * * *